Feb. 17, 1953  J. J. HORAN  2,628,912
DEVICES FOR PACKAGING LIQUID INFANT FOOD
Filed Sept. 5, 1947  2 SHEETS—SHEET 1

INVENTOR.
John J. Horan

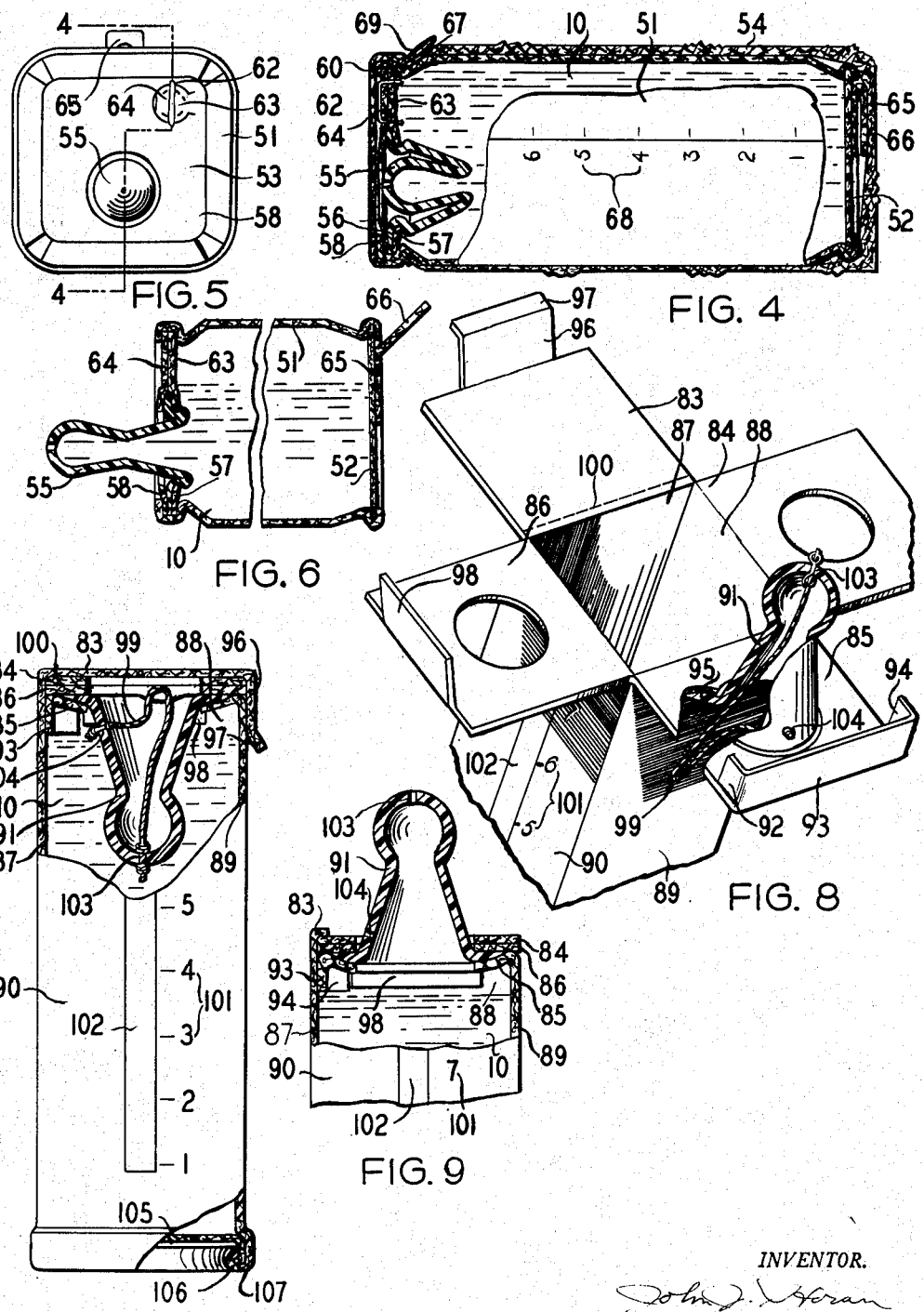

Patented Feb. 17, 1953

2,628,912

UNITED STATES PATENT OFFICE 2,628,912

DEVICES FOR PACKAGING LIQUID INFANT FOOD

John J. Horan, Detroit, Mich.

Application September 5, 1947, Serial No. 772,238

12 Claims. (Cl. 99—171)

1

This invention relates to a method for cartoning liquid infant foods and to single service packages for use with the method.

The packages are especially applicable for construction and filling with the aid of machinery similar to that now used by a large number of dairies for cartoning dairy products for retail stores and for house to house delivery.

The package combines in itself, or eliminates the necessity for, functions formely performed by a variety of containers and apparatus in combination and series for the purpose of dispensing food to infants.

There are included in the package: a paper or fiber container body to hold the food, a foldable nipple secured to the container, a closure over the nipple, a vent, devices to facilitate the addition of cod liver oil or vitamins to the food, a suspension tab, graduations to indicate the amount of food contained at any time, and an outer protective covering enclosing the assembly.

Under the prior art it was formerly necessary for the consumer to compound infant food in small batches from such bases as raw milk, milk powders or condensed milk, adding thereto water and other ingredients, boiling and sterilizing nursing bottles, nipples, caps, covers and mixing apparatus, and, in many instances, boiling milk to purify it, thus reducing its food value.

An object of this invention is to take the task of mixing infant food out of the home, thus eliminating present dangers of inaccuracy of blending and mixing and incompetence in maintaining hygienic conditions, relieving busy parents of young infants of one of their burdens, and permitting the infants to be provided with scientifically compounded nourishing food.

An object of this invention is to make it possible in a simple and feasible way for designers of present cartoning machinery, such as that described in Patent No. 2,174,514, issued October 3, 1939, among others, to modify such machinery to perform many of the operations required for infant food container manufacture, and to enable dairies who are skilled in the use of machinery for filling modern types of cartons for liquids and who can meet the standards necessitated by the requirements for purity, to make use of such equipment for marketing packages enclosing single service containers with necessary accessories, the containers being filled with infant food derived from milk but superior to it for the purpose intended, and being designed to permit infants to feed out of the original containers.

My invention draws from the prior art certain types of container bodies and seaming construction illustrated. The application of the nipples, the means of securing them, the functions of the nipples and other parts associated with nipple bearing closures, and the use of protective closures over nipple closures are novel to these containers and make possible functions and uses not heretofore available.

Further objects and novel features of my invention will become apparent in the balance of the specification, in the claims appended, and in the following description of the drawings in which:

Fig. 4 is a partly sectional drawing of another package in accordance with this invention, the parts being arranged in the closed or shipping position;

Fig. 5 is a view of the nipple end of the container and nipple assembly illustrated as part of the package in Fig. 4;

Fig. 6 is a sectional view of the ends of the container illustrated in Fig. 4, the parts being arranged in the use or feeding position, Fig. 7 is a partly sectional view of a different form of container and nipple assembly in accordance with this invention;

Fig. 8 is a pictorial view in which is shown the method of assembly of the nipple to the container illustrated in Fig. 7;

Fig. 9 is a partly sectional illustration in which is shown a portion of the container and nipple assembly in the feeding position.

Figure 1:
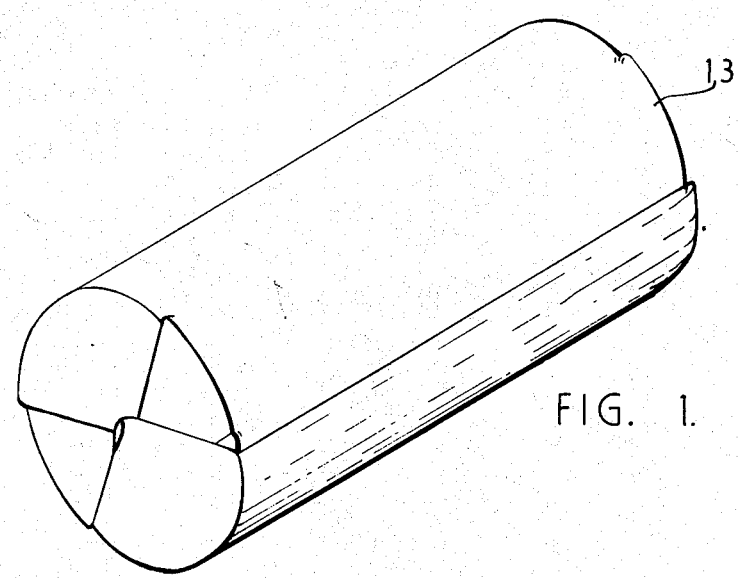
Fig. 1 is a view of the exterior of a package holding a single container in accordance with this invention.
Figure 2:
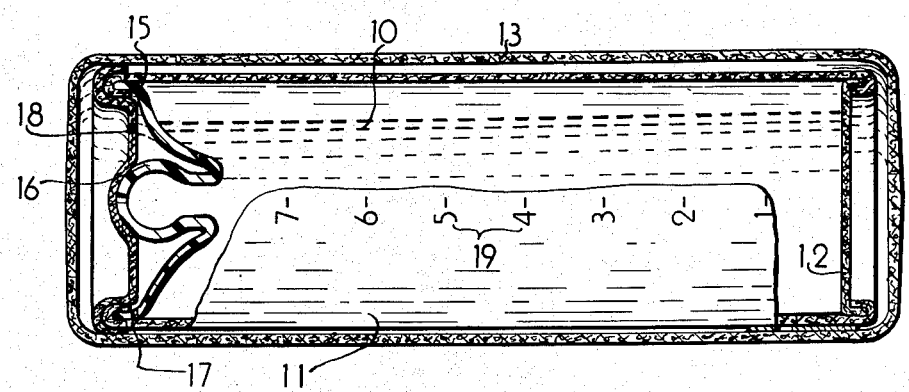
Fig. 2 is a cross sectional view of the package illustrated in Fig. 1.
Figure 3:
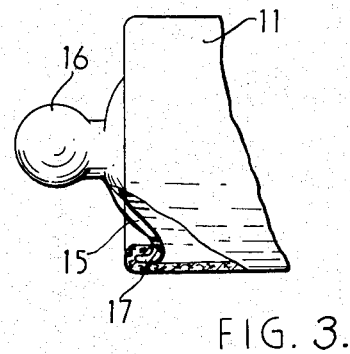
Fig. 3 is a fragmentary partly sectional view of the container shown in Fig. 2.

Referring now specifically to Figs. 1, 2 and 3, there is illustrated a package, including a single container body 11 made from sheet or tubular organic material, such as waterproof coated or impregnated paper, fiber or plastic, the bottom closure 12 and the closure 15 being secured to the body 11 by crimipng and cementing. The container encloses a single feeding portion of liquid infant food 10.

The cylindrical cross section of the body 11 renders obvious the adaptability of the body 11 of this container to manufacture from so called "endless" spiral or helical tubing which has been water proofed and wound in a manner similar to that used in the manufacture of mailing tubes, ammunition containers, etc., though other materials and manner of construction are equally adaptable.

The base closure 12 may be made of sheet material of the same composition as the body 11 if desired.

The nipple closure 15 is shown combined in one piece with the nipple 16, although this is not a necessary feature, since the nipple 16 and the balance of the closure 15 may be of different materials cemented or otherwise bonded together. When of one piece construction as shown, the entire closure 15, 16 may be molded from flexible material such as rubber or synthetic substitute.

I have provided a venting orifice 17, which is obturated when the nipple 16 is in the shipping position, but which, after removal of the outer closure 18 and extension of the nipple 16 to feeding position, functions to relieve pressure differential. The vent 17 may be temporarily stretched by forcible application of a dropper in order to permit insertion of such additaments as the infant's physician may prescribe.

The outer protective covering 13 illustrated is of the wrap around type suitable for enclosing a single filled container and nipple assembly, and is preferably made of waxed or coated paper, the ends being preferably heat sealed. To reduce the number of drawings required I have omitted details of the conventional manner of folding the ends of the covering 13.

Referring again to the container body 11, the cross sectional shape selected is not essential to its functioning but lends itself better to certain methods of mass production manufacture and to certain materials. It is adapted for either nipple end or base end filling with liquid food 10, although the latter is preferable, since it reduces the number of operations which must be performed after filling. Graduations 19, applicable when the body 11 is transparent or translucent, permit ready observation of the amount remaining while the infant is feeding.

Referring now specifically to Figs. 4, 5 and 6, there is here illustrated a package for commerce, including a single container, the body 51 of the container being made from sheet or tubular organic material such as fiber, plastic, or waterproof coated or impregnated paper, the bottom closure 52 and inner closure 53 being secured to the body 51 by cementing, preferably, though not necessarily, by the application of external pressure and heat.

The container body 51 is structurally similar to that of certain present commercial milk containers; but the package, generally, in construction and use, differs from the prior art, especially in the construction of the closures, the application of the nipple 55, and in the necessary addition of the outer protective covering 54.

The inner closure 53 is made of sufficient plies to provide a support for the nipple 55, preferably secured thereto in the manner shown, wherein the flange 56 of the nipple has been inserted between the plies 57, 58 and cemented therebetween, the mating surfaces of the plies also being cemented to each other.

As illustrated in Fig. 4, the nipple 55 is shipped in a half folded position, permitting the outer closure 60 to have a flat surface. When the outer closure 60 and outer protective covering 54 have been removed, squeezing or shaking the container will cause the liquid contents to force the nipple 55 outward into the use position. Venting of the container for the purpose of equalizing internal and external pressure while feeding may be provided by means of a small pierced vent through the nipple 55, or through the inner closure 53, or, as shown, by means of a small staple 62 pressed into the inner closure 53, which staple 62 may be removed by the parent before feeding. Means for insertion by the parent of such additaments to the formula as may be prescribed by the infant's physician are provided by die cuts 63, 64 in the inner closure, a complete circular die cut 63 through the inner ply 57 being directly under a partial die cut 64 through the outer ply 58. Lifting of the edge of the die cut 64 in the outer ply 58 lifts the inner die cut 63 and permits insertion of a dropper, small funnel, etc. The die cuts 63, 64 may then be returned to the closed position by pressure.

A folding suspension tab 65, cemented or stapled to the lower end of the body or to the bottom closure 52 as shown, is provided with a hole 66 which permits suspension of the container in feeding position in a specially constructed nursing bottle holder which will be the subject of another application for Letters Patent.

The outer protective covering 54 may be of water resistant paper, "cellophane," or similar light material. It is not necessary, in this form of the invention, to seal the individual covering 54 separately at the nipple end, since the outer closure 60, which is preferably constructed of material similar to that used for the body 51, is shown crimped and cemented in place over the top of the container, the open end 67 of the covering 54 being secured under the outer closure 60, thus providing complete protection of the container, nipple, and contents from contamination in handling. Stripping of the outer closure 60 and covering 54 is easily performed by the consumer, by means of the outer closure removal tab 69. Outer protection is not merely for convenience, but to prevent contamination of surfaces by handling.

The cross sectional shape is a square with rounded corners. The shape is handy and pleasing but not essential to the container, since circular, hexagonal, or other shapes are almost equally satisfactory from a manufacturing standpoint. For use when the container is made of transparent or partially translucent materials, a set of graduations 68 is provided in order that the consumer may determine the amounts consumed and remaining after feeding.

The container is adapted for either top or bottom filling with liquid infant food 10 by the processor. The body 51 and bottom closure 52 assembled to this container bear resemblance to those of a container in wide use in the dairy industry for packaging milk, this being the principal reason why I have selected this construction for the vehicle for demonstrating my invention. The present commercial milk container is made of processed paper fiber impregnated with wax. Commercial milk containers are usually filled from the pouring end which corresponds to the nipple end of this container. The present milk container is not well adapted for prolonged storage of milk at room temperature; and refrigerated storage is commonly supplied.

The types of inner and outer closures 53, 60 which I have provided in my illustrations are equally adapted, with dimensional changes, for use with other styles of containers.

Referring now to Figs. 7, 8, and 9, there is illustrated a bare container and closure assembly, loaded with liquid infant food 10 for shipment, sale, and for direct dispensing therefrom. The outer protective covering 81 has been omitted to permit greater clarity of presentation of the distinctive features.

The container may be made from a single sheet of paperboard or other material waxed or otherwise impregnated or coated to render it liquid-proof and capable of sealing, preferably by the application of heat or pressure. Foldable extensions 83, 84, 85 and 86 of the sides 87, 88, 89 and 90 are utilized in combination to form the end closure which carries the nipple 91. The arrangement is best suited for prefolding before filling. Of course, hundreds of variations of the sequence and manner of folding and of the cut are possible.

Although in Fig. 8 the nipple 91 is shown for illustration already inserted through the hole in extension 85 before inward folding, it is preferably dropped into the hole after extension 85 has been folded. Integral tabs 92, 93 and 94 lend support to the inwardly folded extension 85 when they are sealed to the sides 90, 87 and 88. The flange 95 of the nipple 91 prevents it from falling through the hole. Afterwards extensions 86, 84 and 83 may be folded successively, the tab 93 lying against the inside face of side 88 and the tab 96 lying against the outside of side 89. The mid portion of the pull member 99, which may be a piece of knotted cord with ends forced through the orifices 103, 104 of the nipple is folded over so that it is entrapped between extensions 84 and 86, which have holes located over the nipple which is suspended inverted and inside out in the container. Extension 83 has a tear perforation 100 adjacent its hinged end and a tab extension 97 extending beyond its tab 96.

The container, nipple, and closure assembly is preferably placed after folding between a set of heated dies, the impregnating and sealing material being caused to soften and flow so that upon removal the closure thus formed is rigid and is liquid proof. Additional sealing material may be flowed over the joints at this time.

The container may then be inverted, filled and closed at the opposite end by any of a number of methods such as that illustrated, which employs an insert 105 having cupped walls 106, extensions of the container sides 107 being folded over in such a manner as to grip the walls 106, the sealing being accomplished also by heated dies which swage the material, especially at the corners, in order to reduce the possibility of leakage. Among the other possible closures for this end may be listed the "Pur-Pak" or folded bag type of closure which requires no insert, but, unless modified, would necessitate shipping the package in an upside down position because it is unsuitable for a base.

Graduations 101 may be provided when the paperboard has been treated to render it translucent or to make a translucent window 102.

After the dispensers have been filled and closed, they may be wrapped or boxed in a manner similar to that of one of the previously described forms.

The parent needs only to remove the outer protective covering, warm the container and closure assembly to body temperature, remove extension 83 at the tear perforation 100 after grasping and lifting the tab extension 97, and turn the nipple right side out by the simple process of lifting out the cord 99, which also prevents coagulated particles from blocking the orifices 103, 104.

No additional holders, fixtures, frames, supports, grips, shields, or other such devices are needed to position, protect, cradle or give aid in any manner during the normal feeding of the infant. Each package forms a complete entity and yields a complete single service nursing device; and all parts may be discarded in their entirety once they have served their purposes. Nor does any portion of the package necessarily serve in the capacity of holder, etc., while the infant is feeding. The suspension tabs are simply devices which broaden the usefulness of the container-nipple assemblies by rendering easier their positioning for unattended feeding of very young infants incapable of grasping the dispenser and likely to disturb it and thus lose it. The tabs may be omitted entirely without affecting in any other manner the usability of the package.

The packages described illustrate some of the possible variations in types of nipple closures and methods of application to this invention of various types of materials and manufacturing processes.

Owing to the nature of organic materials presently employed in the construction of disposable milk containers and to the type of sealing joints employed, it is generally advisable to plan only on refrigerated or short term storage after filling, since at normal temperatures the materials which are generally incapable of maintaining hermetic sealing, particularly when roughly handled, permit bacteria to enter, causing the milk to sour. Accordingly no attempt is usually made to sterilize milk (as distinguished from pasteurize) which would spoil anyway when enclosed in paper or fiber. (The reasons do not lie in the inability of the industry to manufacture permanent storage food containers, but rather in the view of the industry that the economy of paper justifies its use.)

Recognizing this fact and recognizing also that many well equipped municipal dairies can, without major installation cost, supply wholesome, fresh, pasteurized milk formula, I have provided three forms of packages, adaptable to manufacture from paperboard as well as from superior material, which, even without any improvement in the materials or the general methods of joint construction over those presently used, but with refrigerated handling as at present, will serve as excellent shipping packages and formula dispensers.

All of these packages may be filled with infant food which has been merely pasteurized instead of sterilized; and, if proper refrigeration is provided, can be expected to keep the infant food in wholesome condition at least as long as present containers preserve pasteurized milk.

If the industry devises and uses materials that are more impervious to air and water exchange, if better sealing of the joints is accomplished and if inspection is improved, longer storage periods will become possible, assuming that the containers and food are sterile when the packages are sealed.

While there have been shown and described what are at present considered to be the preferred forms of this invention, it will be obvious to those skilled in the art that various changes, modifications, and combinations may be made therein without departing from the true scope of this invention; and it is accordingly intended in the appended claims to cover such equivalents as may fall within the true scope of the invention and without the prior art. Therefore, I claim:

1. A dispenser containing a single feeding amount of liquid infant food, a portion of said dispenser being reinforced by means of a plurality of plies, at least one of said plies having an opening closed by a nipple, the flange of said nipple being secured to said dispenser by gripping between adjacent plies.

2. A dispenser as in claim 1, one of said plies being external to said nipple.

3. A dispenser for liquid infant food comprising a poly-sided body manufactured from sheet material, the sides at one end having extensions folded over and cemented to form a rigid closure, and a nipple having its flange secured to at least one of said folded extensions, another of said extensions being exterior to said nipple and protecting same against contamination.

4. A closure for a dispenser having therein a supply of liquid infant food, comprising a plate member having a hole therein and a nipple having a skirt adhesively attached to said plate member around the periphery of said hole.

5. A closure for a dispenser containing a supply of liquid infant food, said closure comprising a plurality of plate members, and a nipple having a skirt gripped between two adjacent plate members, the neck of said nipple being adapted to project through a hole in one of said plate members.

6. A dispenser containing therein a supply of liquid infant food, said dispenser being manufactured from sheet material, said dispenser having an end portion composed of a plurality of adherently attached plies, and a nipple having a flange portion adherently attached to one of said plies.

7. A dispenser as in claim 6, said nipple having a pull member secured thereto, said pull member being adapted for use in extending said nipple beyond the surface of the said ply to which the said flange portion is attached.

8. A dispenser as in claim 6, said nipple having an orifice therein closed by a pull member, said pull member being capable of detachment to render said orifice functionable after at least one outer ply has been removed.

9. A dispenser as in claim 6, having an opening through at least one inner ply, initially closed by a member removable therefrom.

10. A dispenser containing therein a supply of liquid infant food, said dispenser being manufactured from sheet material, a surface of said dispenser being reinforced by means of a plurality of adherently attached plies of sheet material, one of said plies having an opening closed by a nipple, said nipple having a sucking portion and a generally annular flange, said flange being secured to said dispenser by gripping between adjacent plies.

11. A dispenser containing therein a supply of liquid infant food, said dispenser having a body manufactured from sheet material and constituting a tubular compartment, the lateral surfaces of said tubular compartment having extending therefrom additional material folded over to form an end closure for said compartment reenforced by means of a plurality of adherently attached plies of said sheet material, and a nipple, said nipple having its flange portion adherently attached to a portion of said additional material, another portion of said material being exterior to said nipple and protecting said nipple against contamination.

12. A dispenser containing therein a supply of liquid infant food, said dispenser having a body portion manufactured from sheet material and constituting a poly-sided tubular enclosure, the lateral surfaces of said tubular enclosure having extending therefrom additional material folded over to form a reinforced end closure comprising a plurality of adherently attached plies of said sheet material, and a nipple, said nipple having its flange portion adherently attached to a portion of said additional material, another portion of said material being exterior to said nipple and protecting said nipple against contamination.

JOHN J. HORAN.

REFERENCES CITED

The following references are of record in the file of this patent:

UNITED STATES PATENTS

| Number | Name | Date |
|---|---|---|
| 1,344,760 | Goddard | June 29, 1920 |
| 1,425,539 | Paulsen | Aug. 15, 1922 |
| 1,623,544 | Kushner | Apr. 5, 1927 |
| 1,866,036 | Hartman et al. | July 5, 1932 |
| 2,090,749 | Corsi et al. | Aug. 24, 1937 |
| 2,093,730 | Kurkjian | Sept. 21, 1937 |
| 2,108,114 | Foard, Jr. | Feb. 15, 1938 |
| 2,158,837 | Schukraft | May 16, 1939 |
| 2,298,545 | Waters | Oct. 13, 1942 |
| 2,432,496 | Beason | Dec. 16, 1947 |
| 2,438,299 | Relis | Mar. 23, 1948 |
| 2,460,329 | Allen et al. | Feb. 1, 1949 |